(12) United States Patent
Nakaminami et al.

(10) Patent No.: US 10,439,537 B2
(45) Date of Patent: Oct. 8, 2019

(54) MACHINE TOOL AND DETECTION METHOD

(71) Applicant: DMG MORI CO., LTD., Yamatokoriyama-shi (JP)

(72) Inventors: Masamitsu Nakaminami, Yamatokoriyama (JP); Masahiro Fujiki, Yamatokoriyama (JP); Seiichi Fukuzono, Isehara (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 0 days.

(21) Appl. No.: 15/657,766

(22) Filed: Jul. 24, 2017

(65) Prior Publication Data

US 2018/0026565 A1    Jan. 25, 2018

(30) Foreign Application Priority Data

Jul. 25, 2016    (JP) .................... 2016-145410

(51) Int. Cl.
| | |
|---|---|
| *H02P 23/14* | (2006.01) |
| *H02P 31/00* | (2006.01) |
| *B23Q 17/00* | (2006.01) |
| *B23Q 17/10* | (2006.01) |

(52) U.S. Cl.
CPC ............ *H02P 23/14* (2013.01); *B23Q 17/007* (2013.01); *B23Q 17/10* (2013.01); *H02P 31/00* (2013.01); *B23Q 17/003* (2013.01); *H02P 2203/00* (2013.01)

(58) Field of Classification Search
USPC ............................................. 318/490; 483/7
See application file for complete search history.

(56) References Cited

U.S. PATENT DOCUMENTS

| | | | | |
|---|---|---|---|---|
| 5,202,842 A | * | 4/1993 | Suzuki .............. | G01D 5/24452 377/17 |
| 2004/0029690 A1 | * | 2/2004 | Takaku ............... | B23Q 17/003 483/7 |
| 2006/0261969 A1 | * | 11/2006 | Takaku ............... | B23Q 17/003 340/680 |
| 2017/0308055 A1 | * | 10/2017 | Hoshino ............. | G05B 19/409 |

FOREIGN PATENT DOCUMENTS

JP    2010-149244    7/2010

* cited by examiner

*Primary Examiner* — Bickey Dhakal
*Assistant Examiner* — Zemenay T Truneh
(74) *Attorney, Agent, or Firm* — Oblon, McClelland, Maier & Neustadt, L.L.P.

(57) ABSTRACT

A machine tool is provided capable of detecting an abnormality caused by detaching a spindle. The machine tool includes: the spindle configured to rotate a workpiece or a tool; a sensor configured to output a signal according to a rotation angle of the spindle; and a controller configured to detect occurrence of an abnormality in at least one of the spindle and the sensor when an electrical signal different from the signal output during each of rotation of the spindle and halt of the spindle is output from the sensor.

18 Claims, 5 Drawing Sheets

MACHINE TOOL AND DETECTION METHOD

BACKGROUND OF THE INVENTION

Field of the Invention

The present disclosure relates to a machine tool, particularly, a technique for detecting an abnormality of the machine tool.

Description of the Background Art

As types of machine tools, there are a lathe and a machining center. The lathe machines a workpiece by bringing a tool into contact with the workpiece while rotating the workpiece using a spindle. The machining center machines a workpiece by bringing a tool into contact with the workpiece while rotating the tool using a spindle.

When the spindle or a bearing thereof is broken, unusual sound may be generated from the machine tool. Regarding a technique for suppressing such an abnormality, Japanese Patent Laying-Open No. 2010-149244 discloses a machine tool capable of predicting an abnormality in a bearing, for example.

SUMMARY OF THE INVENTION

When the spindle or the bearing is broken, these components need to be replaced. The replacement of these components requires technical knowledge and advanced technique. Hence, if a person other than specialists replaces these components, machining precision of the machine tool may be decreased from its intrinsic machining precision. The machine tool disclosed in Japanese Patent Laying-Open No. 2010-149244 is configured to predict an abnormality of a bearing, and is not capable of detecting an abnormality caused by detaching a spindle. Therefore, a demand arises in a machine tool capable of detecting detachment of a spindle from the machine tool.

The present disclosure has been made to solve the above problem and has an object in a certain aspect to provide a machine tool capable of detecting an abnormality caused by detaching a spindle. An object thereof in another aspect is to provide a detection method capable of detecting an abnormality caused by detaching a spindle.

According to a certain aspect, a machine tool includes: a spindle configured to rotate a workpiece or a tool; a sensor configured to output a signal according to a rotation angle of the spindle; and a controller configured to detect occurrence of an abnormality in at least one of the spindle and the sensor when a signal different from the signal output during each of rotation of the spindle and halt of the spindle is output from the sensor.

Preferably, the sensor is a magnetic encoder.

Preferably, during each of the rotation of the spindle and the halt of the spindle, the sensor outputs two signals, each signal having phases shifted from each other by a predetermined angle. The controller detects the occurrence of the abnormality when a phase difference between the two signals is not the predetermined angle.

Preferably, the machine tool further includes an output device configured to output a warning to indicate the occurrence of the abnormality when the abnormality is detected by the controller.

Preferably, a timing at which the warning is output includes a timing at which a primary power supply of the machine tool is turned on.

Preferably, the controller stops the warning when a predetermined input is received.

Preferably, the machine tool further includes: a primary power supply configured to supply power to the machine tool; and a secondary power supply configured to supply power to the controller. The controller receives the power supplied from the secondary power supply when the primary power supply is off.

According to another aspect, there is provided a method for detecting an abnormality in a machine tool. The method includes: obtaining a signal according to a rotation angle of a spindle of the machine tool from a sensor; and detecting occurrence of an abnormality in at least one of the spindle and the sensor, based on a signal different from the signal output during each of rotation of the spindle and halt of the spindle being obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The following describes each of embodiments according to the present invention with reference to figures. In the description below, the same reference characters are given to the same parts and components. Their names and functions are also the same. Hence, they are not described in detail repeatedly. It should be noted that each of embodiments and modifications described below may be selectively combined appropriately.

[Internal Structure of Machine Tool 100]

Figure 1:
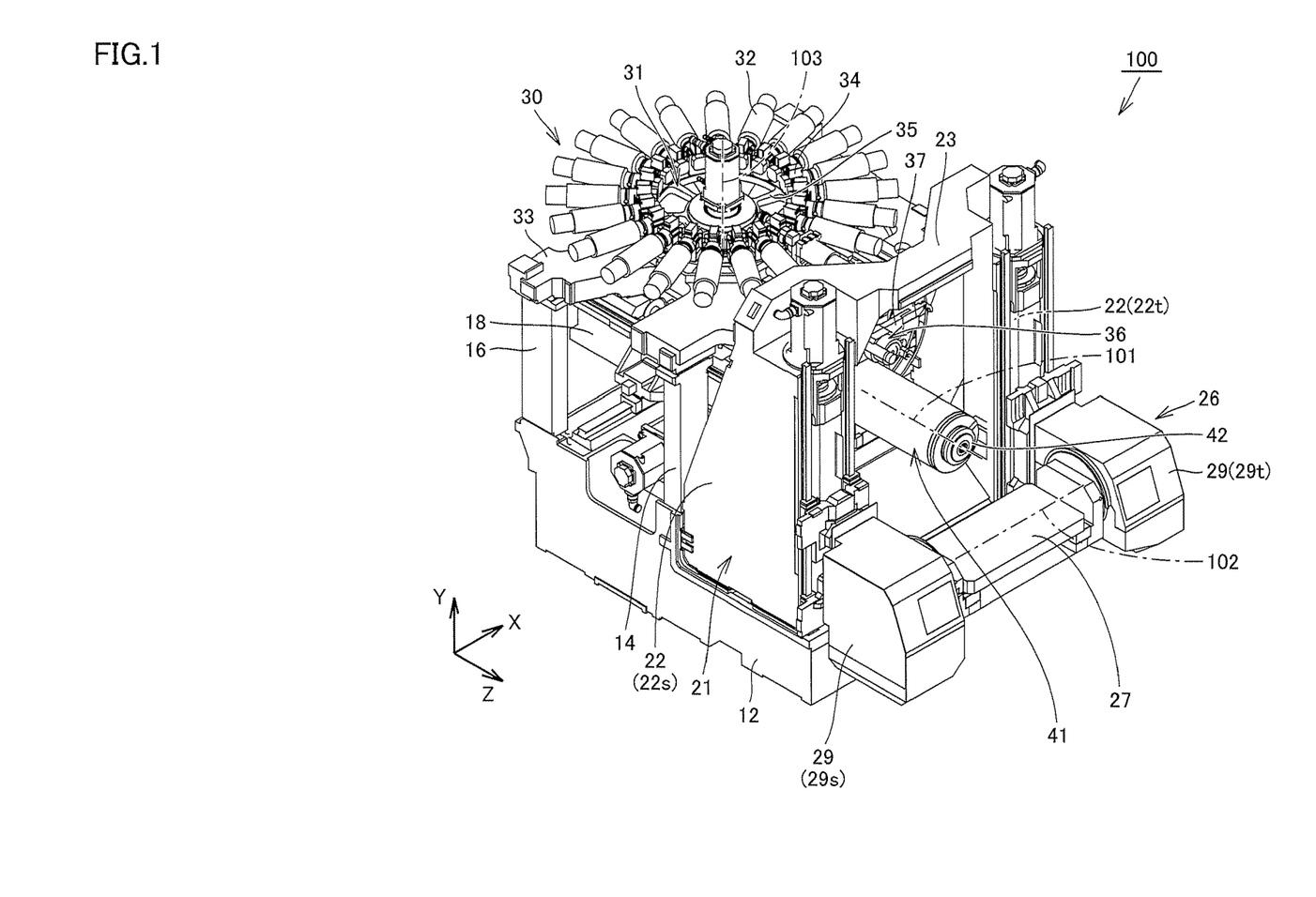
FIG. 1 shows an exemplary internal structure of a machine tool.

A machine tool 100 will be described with reference to FIG. 1. FIG. 1 shows an exemplary internal structure of machine tool 100.

FIG. 1 shows machine tool 100 serving as a machining center. Although the following describes machine tool 100 serving as a machining center, machine tool 100 is not limited to the machining center. For example, machine tool 100 may be a lathe or may be a cutting machine or a grinding machine.

As shown in FIG. 1, machine tool 100 includes a bed 12, a saddle 18, a column 21, a spindle head 41, and a table 26 as a main configuration.

Bed 12 is a base member for mounting saddle 18, column 21, and the like thereon, and is installed on a fixation surface of a factory or the like.

Column 21 is attached to bed 12. Column 21 is fixed to bed 12. Column 21 as a whole has a gate-like shape to stand on the upper surface of bed 12.

More specifically, column 21 has side portions 22 (22s, 22t) and a top portion 23 as constituent regions thereof. Side portions 22 are provided to extend vertically upward from the upper surface of bed 12. Side portion 22s and side portion 22t are disposed with a space interposed therebetween in an X axis direction parallel to the horizontal direction. Top portion 23 is provided to extend from side portion 22s to side portion 22t along the X axis direction.

It should be noted that the mechanical configuration of machine tool 100 basically has a structure bilaterally symmetrical with respect to the center thereof in the X axis direction. In the present embodiment, configurations having reference characters involving "s" and "t" represent a pair of components in the bilateral symmetry.

Saddle 18 is attached to bed 12. Saddle 18 is provided at bed 12 to slidably move in the X axis direction. Spindle head 41 is attached to saddle 18. Spindle head 41 extends toward table 26 through a space surrounded by side portion 22s, top portion 23, side portion 22t, and bed 12. Spindle head 41 is provided to slidably move in a Z axis direction parallel to the horizontal direction and orthogonal to the X axis direction.

Spindle head 41 has a spindle 42. Spindle 42 is provided to be rotatable through motor driving with respect to a center axis 101 parallel to the Z axis direction. A tool for machining a workpiece to be machined is attached to spindle 42. According to rotation of spindle 42, the tool attached to spindle 42 is rotated with respect to center axis 101. It should be noted that when machine tool 100 is a lathe, a workpiece is attached to spindle 42. In this case, the workpiece attached to spindle 42 is rotated according to the rotation of spindle 42.

Bed 12, saddle 18, and spindle head 41 are appropriately provided with: feed and guidance mechanisms for permitting the slide movement of saddle 18 in the X axis direction and the slide movement of spindle head 41 in the Z axis direction; a servo motor serving as a driving source; and the like.

Table 26 is attached to column 21. Table 26 is provided at column 21 to slidably move in a Y axis direction that is parallel to the vertical direction and is orthogonal to the X axis direction and the Z axis direction.

Table 26 is a device for fixing a workpiece, and has a palette 27 and rotation mechanism portions 29 (29s, 29t).

Palette 27 is a metal support to which a workpiece is attached using various types of clamping mechanisms. Palette 27 is provided to be revolvable (a-axis revolution) with respect to a center axis 102 parallel to the X axis by rotation mechanism portions 29. Rotation mechanism portion 29s and rotation mechanism portion 29t are disposed with a space interposed therebetween in the X axis direction. Palette 27 is attached between rotation mechanism portion 29s and rotation mechanism portion 29t. Further, palette 27 may be provided to be revolvable (b-axis revolution) with respect to a center axis orthogonal to the main surface of palette 27.

Column 21 and table 26 are appropriately provided with: feed and guidance mechanisms for permitting the slide movement of table 26 in the Y axis direction; a servo motor serving as a driving source; and the like.

The slide movement of saddle 18 in the X axis direction, the slide movement of spindle head 41 in the Z axis direction, and the slide movement of table 26 in the Y axis direction are combined to three-dimensionally move a position of machining the workpiece by the tool attached to spindle 42.

Machine tool 100 further includes a magazine 30 and an automatic tool changer (ATC) 36. Magazine 30 is a device for accommodating tools 32 to be attached to spindle 42 for replacement. Automatic tool changer 36 is a device for changing the tools between spindle 42 and magazine 30.

Magazine 30 has a magazine body portion 31, pillar members 14, 16, and a support member 33.

Magazine body portion 31 has a plurality of tool holding portions 34 and a sprocket 35. Each of tool holding portions 34 is configured to be capable of holding tool 32. The plurality of tool holding portions 34 are annularly arranged at the circumference of sprocket 35. Sprocket 35 is provided to be rotatable through motor driving with respect to a center axis 103 parallel to the Y axis. According to rotation of sprocket 35, the plurality of tool holding portions 34 are moved to rotate with respect to center axis 103.

Magazine body portion 31 is supported by pillar members 14, 16 and support member 33 at a position distant away from bed 12 vertically upwardly.

According to rotation of sprocket 35, a tool holding portion 34 holding a specific tool 32 is brought to a predetermined position at the front of the machine. Specific tool 32 is conveyed in the Z axis direction by a tool conveying device (not shown) and is moved to a tool replacement position. Double arms 37 included in automatic tool changer 36 are revolved to replace the tool attached to spindle 42 with specific tool 32 conveyed to the tool replacement position.

[Detection of Detachment of Spindle 42]

Figure 2:
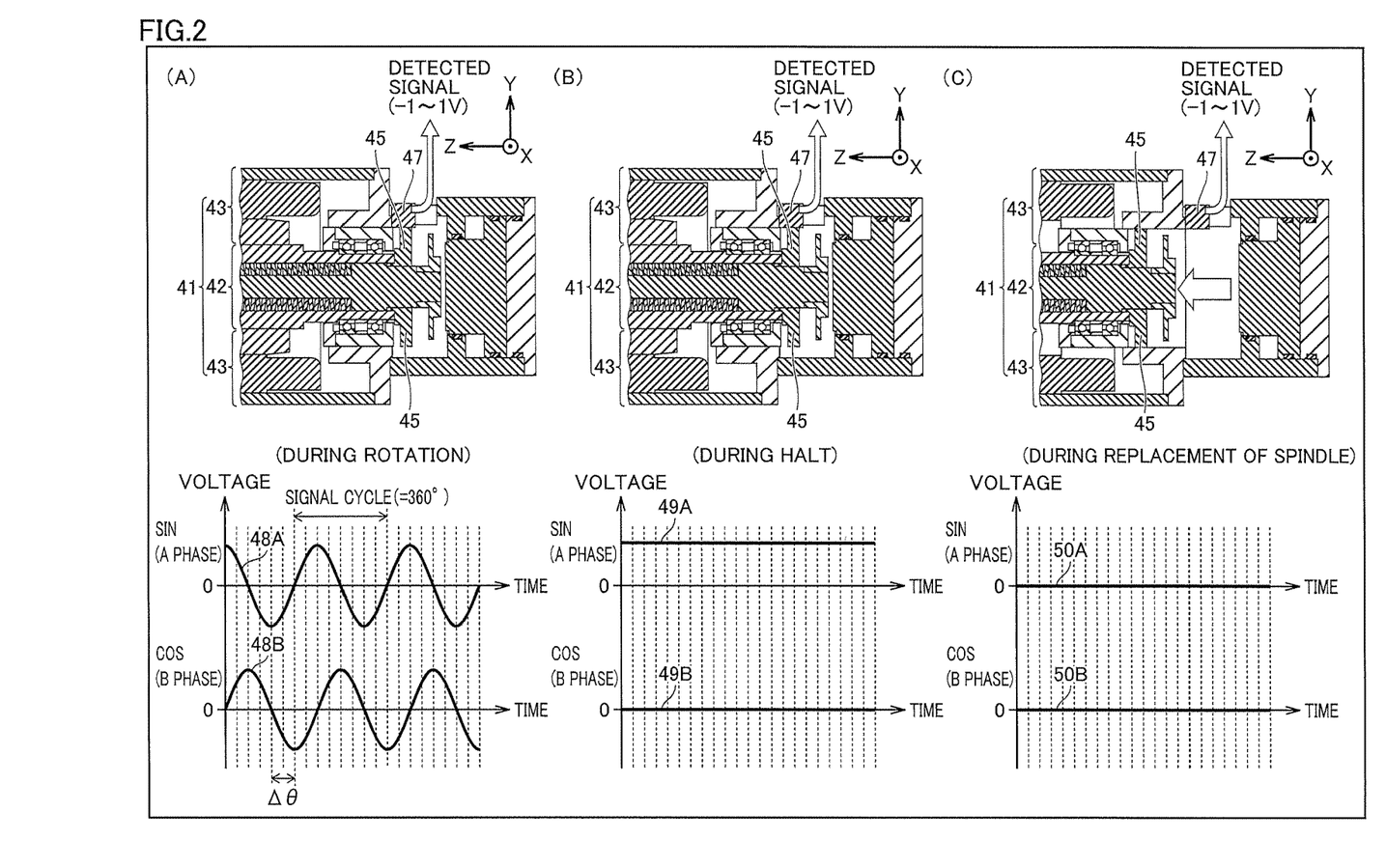
FIG. 2 shows a relation between a state of a spindle in relation with the machine tool and an electrical signal output according to a rotation angle of the spindle.

With reference to FIG. 2, the following describes a method for detecting detachment of spindle 42 from machine tool 100. FIG. 2 shows a relation between a state of spindle 42 in relation with machine tool 100 and an electrical signal output according to a rotation angle of spindle 42.

As shown in FIG. 2, spindle head 41 of machine tool 100 includes spindle 42 and a housing 43. Spindle 42 is configured to be stored in housing 43. A gear 45 is provided in spindle 42. Gear 45 is fixed to spindle 42.

A sensor 47 is provided to face gear 45. Sensor 47 outputs an electrical signal according to a rotation angle of spindle 42. Sensor 47 is a magnetic encoder (magnetic sensor), for example. A bias magnet (not shown) is provided near the magnetic encoder. Rotation of gear 45 causes a change in magnetic field generated from the bias magnet. The magnetic encoder detects the change in magnetic field.

Preferably, according to the rotation angle of spindle 42, sensor 47 outputs two electrical signals having phases shifted from each other by a predetermined angle (for example, 90°). More specifically, sensor 47 includes two magnetoresistive elements connected to a power supply in parallel. The resistance value of each of the magnetoresistive elements is changed partially according to a change in flux density. Therefore, voltages at A and B points are changed according to the rotation of spindle 42. There is a predetermined pitch between the A point and the B point. Accordingly, sensor 47 outputs A-phase and B-phase electrical signals having phases shifted from each other by a predetermined angle (for example, 90°).

In an example (A) of FIG. 2, waveforms 48A, 48B of the electrical signals output from sensor 47 during the rotation of spindle 42 are shown. Sensor 47 outputs two electrical signals (waveforms 48A, 48B) having phases shifted from each other by an angle Δθ (for example, 90°). Whenever each tooth of gear 45 passes in front of sensor 47, waveforms 48A, 48B of the electrical signals are changed in one cycle. Each of the electrical signals is changed cyclically during the rotation of spindle 42 as indicated by waveforms 48A, 48B.

In an example (B) of FIG. 2, waveforms 49A, 49B of the electrical signals output from sensor 47 during halt of spindle 42 are shown. As shown in the example (B) of FIG. 2, during the halt of spindle 42, the magnitudes of the electrical signals are constant as indicated by waveforms 49A, 49B. On this occasion, the phase of the electrical signal as indicated by waveform 49A and the phase of the electrical signal as indicated by waveform 49B are shifted from each other by the predetermined angle (for example, 90°). Hence, both the magnitudes of the electrical signals do not become zero. In other words, even when the magnitude of one of the electrical signals becomes zero, the magnitude of the other of the electrical signals does not become zero.

In an example (C) of FIG. 2, waveforms 50A, 50B of the electrical signals output from sensor 47 during replacement of spindle 42 are shown. As shown in the example (C) of FIG. 2, when spindle 42 is detached from housing 43, both the magnitudes of the electrical signals become zero as indicated by waveforms 50A, 50B.

Thus, the waveforms of the signals of sensor 47 during the replacement of spindle 42 are different from those during the rotation of spindle 42 and the halt of spindle 42. In view of this point, when an electrical signal different from an electrical signal output during each of rotation of spindle 42 and halt of spindle 42 is output from sensor 47, a controller 51 (see FIG. 4) of machine tool 100 detects occurrence of an abnormality (hereinafter, also referred to as "abnormality of machine tool 100") in at least one of spindle 42 and sensor 47. The abnormality of machine tool 100 that can be detected includes at least one of detachment of spindle 42 from housing 43, detachment of spindle 42 and housing 43 from machine tool 100, and detachment of sensor 47 from housing 43.

In a certain aspect, controller 51 of machine tool 100 detects the occurrence of the abnormality of machine tool 100 when a phase difference between the two electrical signals output from sensor 47 is not the predetermined angle (for example, 90°). The two electrical signals output from sensor 47 always have the phase difference of the predetermined angle (for example, 90°) during each of the rotation of spindle 42 and the halt of spindle 42. On the other hand, during the replacement of spindle 42, there is no phase difference between the two electrical signals output from sensor 47. Accordingly, based on the phase difference between the two electrical signals output from sensor 47, controller 51 can determine whether or not spindle 42 is detached from housing 43.

In another aspect, controller 51 of machine tool 100 can detect an abnormality of machine tool 100 when both the magnitudes of the two electrical signals output from sensor 47 are zero.

[Method of Warning for Abnormality of Machine Tool 100]

Figure 3:
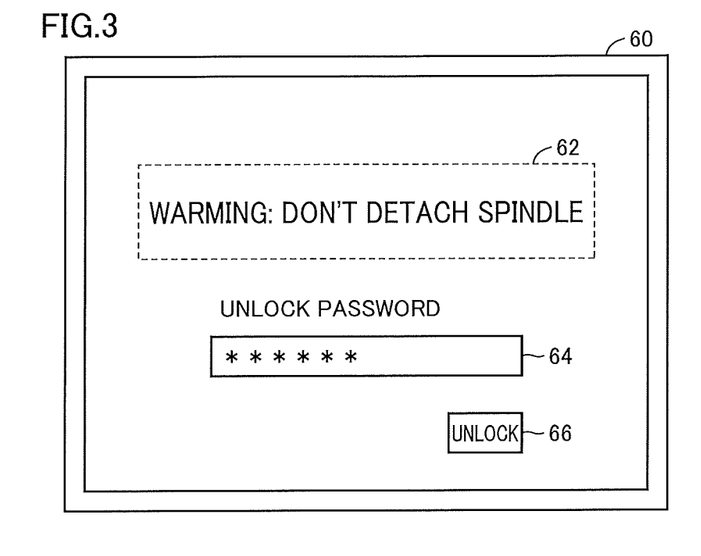
FIG. 3 shows an exemplary screen for warning for an abnormality of the machine tool.

With reference to FIG. 3, the following describes a method of warning for an abnormality of machine tool 100. FIG. 3 shows an exemplary screen to warn for an abnormality of machine tool 100.

When an abnormality of machine tool 100 is detected, machine tool 100 outputs a warning to indicate occurrence of the abnormality. FIG. 3 shows a display 60, which is an exemplary output device for warning. Display 60 may be constructed in one piece with machine tool 100, or may be constructed as a device separated from machine tool 100.

Display 60 presents a warning 62 when an abnormality of machine tool 100 is detected. Warning 62 is output as a message, for example. Warning 62 may be output by way of an alarm, voice, or the like.

Controller 51 of machine tool 100 stops warning 62 when a predetermined input is received. More specifically, the warning screen has an input region 64 for accepting entry of a password. A maintenance service person for machine tool 100 inputs the password into input region 64 and presses an unlock button 66. Machine tool 100 verifies the input password against a password registered in advance. When these passwords coincide with each other, machine tool 100 dismisses the presentation of warning 62.

Preferably, when the abnormality of machine tool 100 is detected, machine tool 100 transmits a notification to another device to indicate the detachment of spindle 42. This notification is transmitted to a mobile terminal (such as a smartphone or a wearable terminal) held by the maintenance service person for machine tool 100, for example. The maintenance service person checks the notification on the mobile terminal, and therefore can immediately recognize the detachment of spindle 42.

More preferably, when the abnormality of machine tool 100 is detected, machine tool 100 stops supplying power to each device (for example, a motor, an actuator, or the like) for machining. Accordingly, when spindle 42 is detached from machine tool 100, machine tool 100 becomes unusable.

Warning 62 is output at any timing. In a certain aspect, warning 62 is output at a timing at which a primary power supply of machine tool 100 is turned on. Accordingly, machine tool 100 can delay the output timing of warning 62. As a result, machine tool 100 can prevent warning 62 from being presented to a proper maintenance service person. In another aspect, warning 62 is output immediately after the abnormality of machine tool 100 is detected.

[Hardware Configuration]

Figure 4:
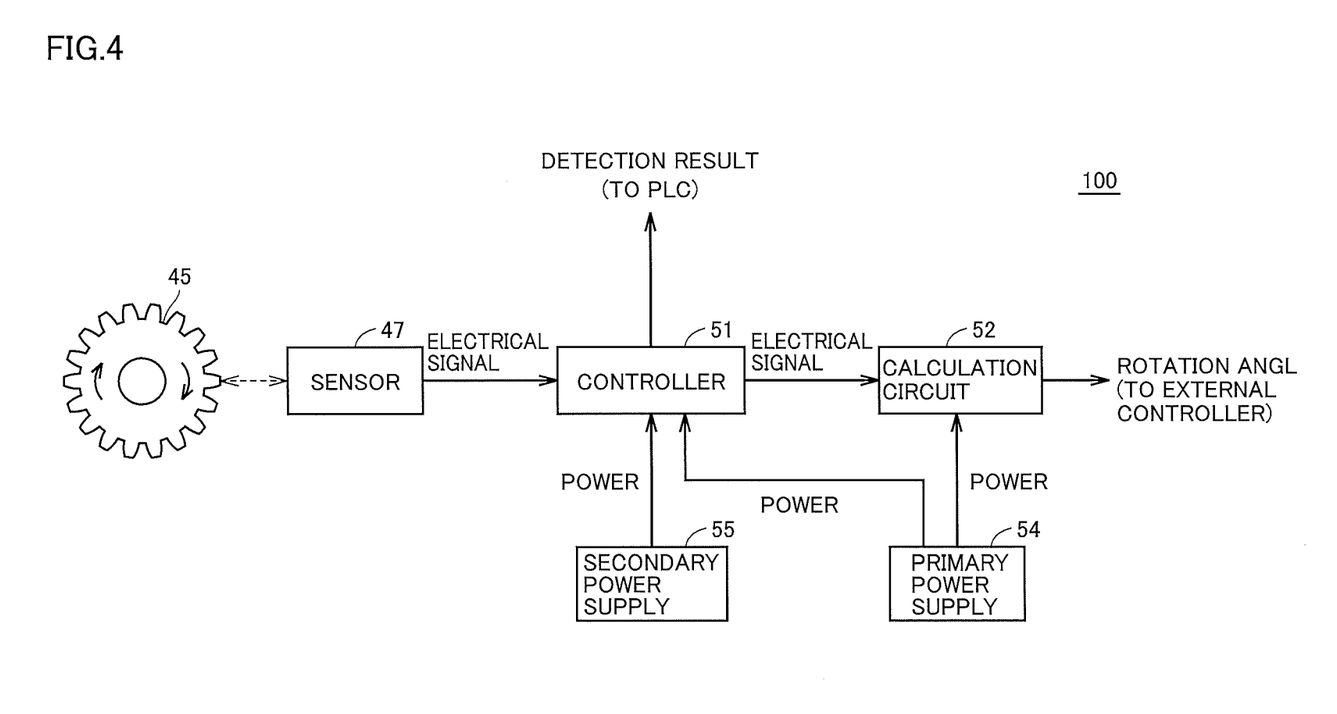
FIG. 4 shows a main configuration for detecting an abnormality of the machine tool.

With reference to FIG. 4, the following describes a hardware configuration for detecting an abnormality of machine tool 100. FIG. 4 shows a main configuration for detecting an abnormality of machine tool 100.

As shown in FIG. 4, machine tool 100 includes gear 45 of spindle 42 (see FIG. 1), controller 51, a calculation circuit 52, a primary power supply 54, and a secondary power supply 55.

A plurality of teeth are provided at the circumference of gear 45. The teeth are provided at an equal interval. Sensor 47 outputs, to controller 51, an electrical signal according to a rotation angle of gear 45. Controller 51 is constituted of at least one integrated circuit, for example. For example, the integrated circuit is constituted of at least one CPU (Central Processing Unit), at least one ASIC (Application Specific Integrated Circuit), at least one FPGA (Field Programmable Gate Array), or a combination thereof.

Controller 51 is a detection unit for detecting an abnormality of machine tool 100. The detection method for the abnormality of machine tool 100 is as described above, and therefore will not be described repeatedly. Controller 51 provides an output to a PLC (Programmable Logic Controller) to notify that an abnormality of machine tool 100 is detected. Moreover, controller 51 outputs an electrical signal from sensor 47 to calculation circuit 52.

Calculation circuit 52 calculates the rotation angle of gear 45 based on the electrical signal detected by sensor 47. Here, the following describes an exemplary method of calculating the rotation angle. One (hereinafter, also referred to as "reference tooth") of the teeth of gear 45 has a shape different from those of the other teeth. The voltage of an electrical signal (hereinafter, also referred to as "reference signal") when the reference tooth passes in front of sensor 47 is different from the voltage of an electrical signal when each of the other teeth passes in front of sensor 47. Calculation circuit 52 assumes that the tooth number of gear 45 when the reference signal is detected is 0. Whenever each of the teeth of gear 45 passes in front of sensor 47, the electrical signal is changed in one cycle. Calculation circuit 52 counts the number of waves of the electrical signal. The number of counts corresponds to the number of teeth. The rotation angle of gear 45 is proportional to the counted number of teeth. Calculation circuit 52 calculates the rotation angle of gear 45 by multiplying a rotation angle corresponding to one tooth by the number of counts. The number of counts is reset whenever the reference signal is detected. Calculation circuit 52 outputs the calculated rotation angle of gear 45 to an external controller. The rotation angle of gear 45 is output in accordance with an interface protocol for the external controller. It should be noted that actually, angle information more detailed than the angle of one tooth may be found from the voltages of the A-phase and B-phase electrical signals that are changed cyclically for each tooth of gear 45, and may be then combined with the rough rotation angle obtained by way of the above-mentioned count value, thereby outputting detailed angle information across the entire circumference of the gear.

Primary power supply 54 supplies power to machine tool 100. That is, primary power supply 54 supplies power to each configuration of machine tool 100 for machining a workpiece. As an example, the primary power supply supplies power to controller 51, calculation circuit 52, and the like. While machine tool 100 is driven, controller 51 receives power supplied from primary power supply 54.

Secondary power supply 55 supplies power to controller 51. Secondary power supply 55 is a power supply only for controller 51. A user of machine tool 100 normally turns off primary power supply 54 when detaching spindle 42 from machine tool 100. Controller 51 receives power supplied from secondary power supply 55 while primary power supply 54 is off. Accordingly, even when primary power supply 54 is off, controller 51 can detect an abnormality of machine tool 100.

[Control Structure of Machine Tool 100]

Figure 5:
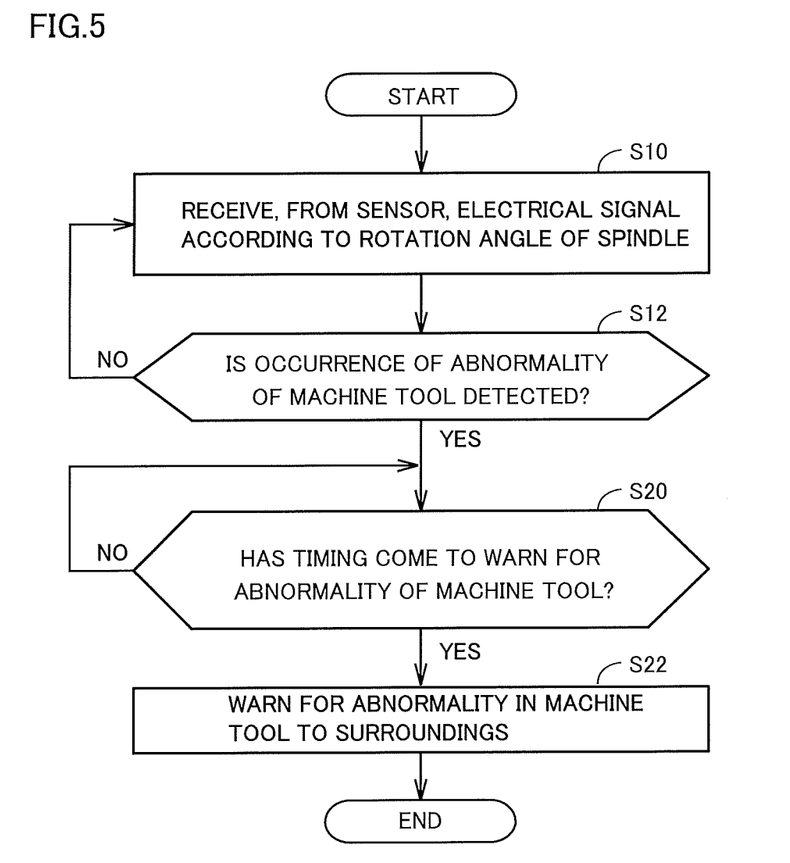
FIG. 5 is a flowchart showing a part of process performed by the machine tool.

With reference to FIG. 5, the following describes a control structure of machine tool 100. FIG. 5 is a flowchart showing a part of process performed by machine tool 100. The process of FIG. 5 is implemented by controller 51 (see FIG. 4) of machine tool 100 executing a program. In another aspect, a part or whole of the process may be performed by a circuit element or other hardware.

In a step S10, controller 51 receives, from sensor 47 (see FIG. 2), an electrical signal according to the rotation angle of spindle 42 (see FIG. 2).

In a step S12, controller 51 determines whether or not an abnormality of machine tool 100 has occurred. More specifically, controller 51 determines that an abnormality has occurred in at least one of spindle 42 and sensor 47, when an electrical signal different from the electrical signal output during each of the rotation of spindle 42 and the halt of spindle 42 is obtained. When it is determined that the abnormality of machine tool 100 has occurred (YES in step S12), controller 51 switches the control to a step S20. Otherwise (NO in step S12), controller 51 returns the control to step S10.

In step S20, controller 51 determines whether or not a timing has come to warn for the abnormality of machine tool 100 to surroundings. As an example, the timing at which the warning for the abnormality of machine tool 100 is provided to the surroundings is a timing at which the primary power supply of machine tool 100 is turned on. Alternatively, the timing at which the warning for the abnormality of machine tool 100 is provided to the surroundings is immediately after the abnormality of machine tool 100 is detected. When it is determined that the timing has come to warn for the abnormality of machine tool 100 to the surroundings (YES in step S20), controller 51 switches the control to a step S22. Otherwise (NO in step S20), controller 51 performs the process of step S20 again.

In step S22, controller 51 warns for the occurrence of the abnormality in machine tool 100. As an exemplary manner of warning, controller 51 presents a message on display 60 (see FIG. 3) to indicate the occurrence of the abnormality in machine tool 100. Alternatively, controller 51 outputs a voice or alarm to indicate the occurrence of the abnormality in machine tool 100.

[Conclusion]

As described above, machine tool 100 detects occurrence of an abnormality in at least one of spindle 42 and sensor 47 when an electrical signal different from an electrical signal output during each of rotation of spindle 42 and halt of spindle 42 is output from sensor 47. Accordingly, machine tool 100 can detect an abnormality caused by detaching spindle 42.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A machine tool comprising:
   a spindle configured to rotate a workpiece or a tool;
   a sensor configured to output a signal according to a rotation angle of the spindle; and
   a controller configured to detect occurrence of an abnormality in at least one of the spindle and the sensor when a signal is output from the sensor that is different from the signal output during each of rotation of the spindle and halt of the spindle,
   wherein the abnormality includes at least one of detachment of the spindle from a housing, detachment of the spindle and the housing from the machine tool, and detachment of the sensor from the housing,
   wherein during each of the rotation of the spindle and the halt of the spindle, the sensor outputs two signals, each signal having phases shifted from each other by a predetermined angle, and
   wherein the controller detects the occurrence of the abnormality when a phase difference between the two signals is not the predetermined angle.

2. The machine tool according to claim 1, wherein the sensor is a magnetic encoder.

3. The machine tool according to claim 1, further comprising an output device configured to output a warning to indicate the occurrence of the abnormality when the abnormality is detected by the controller.

4. The machine tool according to claim 3, wherein a timing at which the warning is output includes a timing at which a primary power supply of the machine tool is turned on.

5. The machine tool according to claim 3, wherein the controller stops the warning when a predetermined input is received.

6. The machine tool according to claim 1, further comprising:

a primary power supply configured to supply power to the machine tool; and a secondary power supply configured to supply power to the controller, wherein the controller receives the power supplied from the secondary power supply when the primary power supply is off.

7. A method for detecting an abnormality in a machine tool, the method comprising:

obtaining a signal according to a rotation angle of a spindle of the machine tool from a sensor; and detecting occurrence of an abnormality in at least one of the spindle and the sensor, based on a signal that is obtained that is different from the signal output during each of rotation of the spindle and halt of the spindle, wherein the abnormality includes at least one of detachment of the spindle from a housing, detachment of the spindle and the housing from the machine tool, and detachment of the sensor from the housing, wherein the obtaining includes receiving two signals, each signal having phases shifted from each other by a predetermined angle, and wherein the detecting includes detecting the occurrence of the abnormality based on a phase difference between the two signals being not the predetermined angle.

8. The method according to claim 7, wherein the sensor is a magnetic encoder.

9. The method according to claim 7, further comprising outputting a warning to indicate the occurrence of the abnormality, based on the abnormality being detected.

10. The method according to claim 9, wherein a timing at which the warning is output includes a timing at which a primary power supply of the machine tool is turned on.

11. The method according to claim 9, further comprising stopping the warning when a predetermined input is received.

12. The method according to claim 7, further comprising supplying power from a secondary power supply for supplying power to a controller of the machine tool to the controller based on a primary power supply for supplying power to the machine tool being off.

13. A machine tool comprising:

a spindle configured to rotate a workpiece or a tool;

a sensor configured to output a signal according to a rotation angle of the spindle; and a controller configured to detect occurrence of an abnormality in at least one of the spindle and the sensor when a signal different from the signal output during each of rotation of the spindle and halt of the spindle is output from the sensor, wherein during each of the rotation of the spindle and the halt of the spindle, the sensor outputs two signals, each signal having phases shifted from each other by a predetermined angle, and the controller detects the occurrence of the abnormality when a phase difference between the two signals is not the predetermined angle.

14. A machine tool comprising:

a spindle configured to rotate a workpiece or a tool;

a sensor configured to output a signal according to a rotation angle of the spindle;

a controller configured to detect occurrence of an abnormality in at least one of the spindle and the sensor when a signal different from the signal output during each of rotation of the spindle and halt of the spindle is output from the sensor; and an output device configured to output a warning to indicate the occurrence of the abnormality when the abnormality is detected by the controller, wherein a timing at which the warning is output includes a timing at which a primary power supply of the machine tool is turned on.

15. A machine tool comprising:

a spindle configured to rotate a workpiece or a tool;

a sensor configured to output a signal according to a rotation angle of the spindle;

a controller configured to detect occurrence of an abnormality in at least one of the spindle and the sensor when a signal different from the signal output during each of rotation of the spindle and halt of the spindle is output from the sensor;

a primary power supply configured to supply power to the machine tool; and a secondary power supply configured to supply power to the controller, wherein the controller receives the power supplied from the secondary power supply when the primary power supply is off.

16. A method for detecting an abnormality in a machine tool, the method comprising:

obtaining a signal according to a rotation angle of a spindle of the machine tool from a sensor; and detecting occurrence of an abnormality in at least one of the spindle and the sensor, based on a signal different from the signal output during each of rotation of the spindle and halt of the spindle being obtained, wherein the obtaining includes receiving two signals, each signal having phases shifted from each other by a predetermined angle, and the detecting includes detecting the occurrence of the abnormality based on a phase difference between the two signals being not the predetermined angle.

17. A method for detecting an abnormality in a machine tool, the method comprising:

obtaining a signal according to a rotation angle of a spindle of the machine tool from a sensor;

detecting occurrence of an abnormality in at least one of the spindle and the sensor, based on a signal different from the signal output during each of rotation of the spindle and halt of the spindle being obtained; and outputting a warning to indicate the occurrence of the abnormality, based on the abnormality being detected, wherein a timing at which the warning is output includes a timing at which a primary power supply of the machine tool is turned on.

18. A method for detecting an abnormality in a machine tool, the method comprising:

obtaining a signal according to a rotation angle of a spindle of the machine tool from a sensor;

detecting occurrence of an abnormality in at least one of the spindle and the sensor, based on a signal different from the signal output during each of rotation of the spindle and halt of the spindle being obtained; and supplying power from a secondary power supply for supplying power to a controller of the machine tool to the controller based on a primary power supply for supplying power to the machine tool being off.

* * * * *